United States Patent [19]

Maezumi

[11] 4,337,510
[45] Jun. 29, 1982

[54] READ CONTROL SYSTEM FOR A CONTROL STORAGE DEVICE

[75] Inventor: Juichi Maezumi, Ome, Japan

[73] Assignee: Tokyo Shibaura Denki Kabushiki Kaisha, Japan

[21] Appl. No.: 120,887

[22] Filed: Feb. 12, 1980

[30] Foreign Application Priority Data

Feb. 16, 1979 [JP] Japan .................................. 54/16016

[51] Int. Cl.³ ................................................. G06F 9/22
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,646,522 | 2/1972 | Furman et al. | 364/200 |
| 4,038,643 | 7/1977 | Kim | 364/200 |
| 4,173,041 | 10/1979 | Dvorak et al. | 364/200 |

Primary Examiner—Raulfe B. Zache

Attorney, Agent, or Firm—Finnegan, Henderson, Farabow, Garrett & Dunner

[57] ABSTRACT

The operation code of a user instruction is supplied to a control storage device and a second entry control storage device, through a selector. The control storage device produces a start microinstruction of a microprogram corresponding to a user instruction specified by the operation code. At the same time, the second entry control storage device produces an address for specifying a memory location of the control device where a second microinstruction to be executed following the microprogram is stored. At the next step, the start microinstruction is executed and at the same time the second address produced is supplied to the control storage device and the second microinstruction of the microprogram is read out. In the succeeding steps, either the address of an address register or a branch address of a microinstruction data register is supplied to the control storage device through the selector, thereby to read out the microinstruction.

15 Claims, 14 Drawing Figures

READ CONTROL SYSTEM FOR A CONTROL STORAGE DEVICE

The present invention relates to a read control system for a control storage device by which a microprogram corresponding to a user instruction may be controlled from the control storage device at a high speed.

In conventionally accessing a control storage device storing microprograms which are comprised of a plurality of microinstructions, a plurality of user instructions to be executed are first read out from a main memory and loaded into an instruction buffer. The user instruction to be executed first is read out from the instruction buffer and loaded into an instruction register. Then, an operation code (hereinafter referred to as OP code) of the user instruction stored in the instruction register is transferred to a decode read only memory (hereinafter referred to as decode ROM). The OP code represents the contents of the instruction and an address of a memory location of the decode ROM.

The memory location of the decode ROM represented by the address stores a start address of the control storage device. The start address is the start address of a microprogram corresponding to the user instruction. The start address is transferred through a selector switch to both the control storage device and a microprogram address register. When the start address is transferred to the control storage device, the first microinstruction of the microprogram corresponding to the user instruction is read out from the control storage device. The microinstruction read out is loaded into a microinstruction register. The microinstruction stored in the microinstruction register is transferred to a decoder where it is decoded to produce a plurality of control signals by which an information processor is controlled.

The microprogram address register temporarily stores the address outputted through the selector switch and increments that address.

When the microinstruction read out from the control storage device is not a branch instruction, the incremented address read out from the microprogram address register is supplied to the control storage device and the microprogram address register through the selector switch. The next microinstruction is read out from the control storage device from the address designated by the incremented address. In the microprogram address register, the supplied address is incremented.

Either the incremented address supplied from the microprogram address register or a branch address, when the microinstruction read out into the microinstruction register is a branch instruction, is transferred through the selector switch to both the control storage device and the microprogram address register. A next microinstruction is read out of the control storage device and performed. In this way, the user instruction is performed.

For further details of the above description, reference is made to U.S. Pat. No. 3,646,522.

In the read control system mentioned above, the user instruction read out from the instruction buffer is temporarily stored in the instruction register and then is supplied to the decode ROM where the OP code is obtained and thus the start address of the user instruction is obtained. A long time is taken for obtaining the start address and this hinders the speed of the operation in the information processor. Further, since the start address is read out from the decode ROM, an access time of the ROM is included in a machine cycle, resulting in elongation of the machine cycle.

Accordingly, an object of the present invention is to provide an improved read control system for a control storage device which can read out from a control storage device a microprogram corresponding to a user instruction.

To achieve the above object, there is provided a read control system for a control storage device, including an instruction buffer for supplying user instructions including operation codes, the system comprising:

a first read only memory for storing at selectively addressable memory locations thereof, a plurality of microinstructions of microprograms corresponding to the user instructions;

a second read only memory for storing a plurality of addresses for specifying memory locations in the first read only memory, the specified momory locations containing only second microinstructions of the microprograms corresponding to the user instructions;

a first register for holding a microinstruction read out from the first read only memory, the microinstruction selectively corresponding to either (1) a start microinstruction read out from the first read only memory from a memory location specified by address data comprising an operation code of a user instruction supplied by the instruction buffer, the user instruction being selectively supplied to the first read only memory concurrently with an outputting from the first register of a last microinstruction of a microprogram corresponding to a preceding user instruction, or (2) a second microinstruction read out from a memory location specified by an address derived from the second read only memory, the latter address specified by the address data comprising the operation code of the user instruction, the user instruction being selectively supplied to the second read only memory; and a second register for holding an address read out from the second read only memory, the last address being read out from the second read only memory in parallel with the reading out of the start microinstruction from the first read only memory into the first register, and for supplying the address to the first read only memory in parallel with the outputting of the start microinstruction from said first register.

This invention can be more fully understood from the following detailed description when taken in conjunction with the accompanying drawings, in which.

Figure 1:
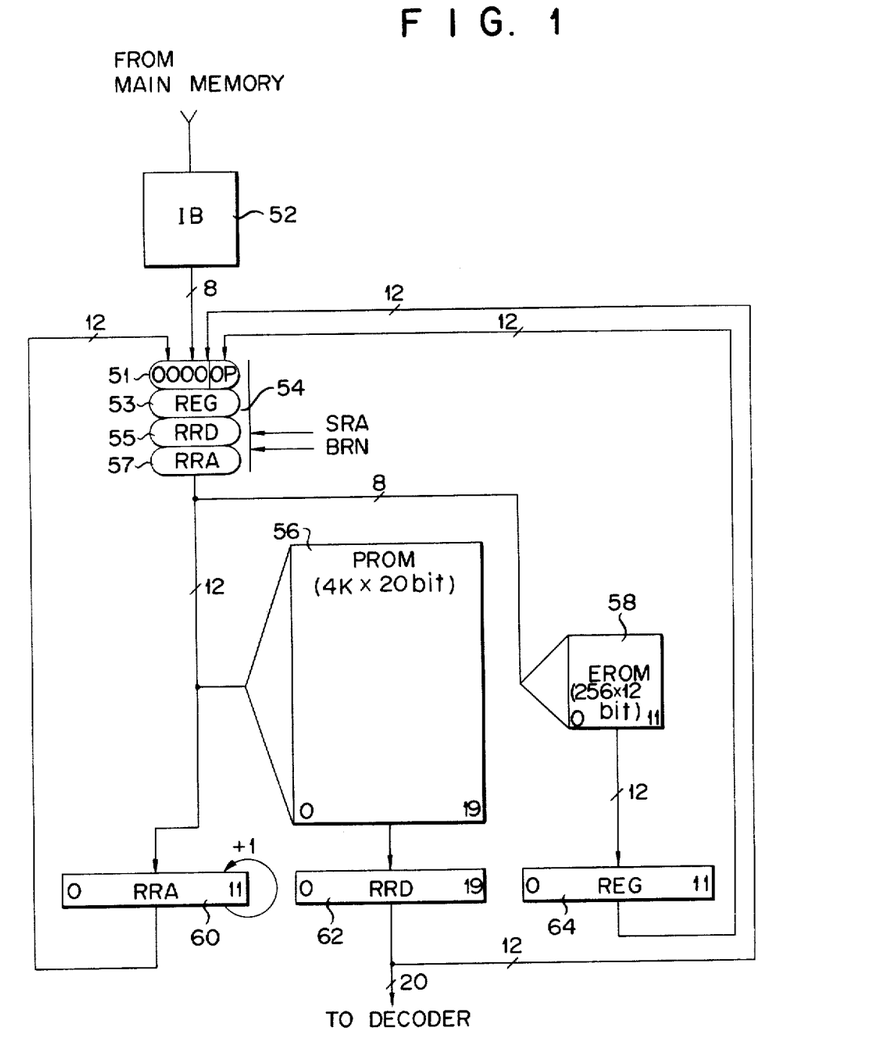
FIG. 1 shows a block diagram of a substantial part of an embodiment of a read control system for a control storage device according to the invention.

FIG. 1 shows a substantial part of a read control system for a control storage device according to the invention. In the figure, an OP code outputted from an instruction buffer 52 is inputted to a selectors/multiplexers 54. Under the control of select signals SRA and BRN, the selectors/multiplexers 54 selects one of four address information inputs and outputs address data. The selectors/multiplexers 54 are expressed as a plurality of switches in the following explanation so that the selection function is easily understood.

The selectors/multiplexers 54 comprises an OP code switch 51 which selectively outputs an OP code of a user instruction supplied from the instruction buffer 52; an REG switch 53 which selectively outputs an address readout from a second entry control storage device 58, described later; and RRD switch 55 which selectively outputs a branch address readout from a first read only memory, that is, a control storage device 56; and an RRA switch 57 which selectively outputs an address supplied from an address register 60.

In this embodiment, the most significant 4 bits of the OP code switch 51 are set to logical "0" (that is, input terminals are grounded) since the OP code is comprised of 8 bits.

The output of the selectors/multiplexers 54 is connected to the inputs of the control storage device 56 (hereinafter referred to an PROM 56), having a capacity, for example, of 4×20 bits (K=1,024) and storing a plurality of microinstructions; the second read only memory, that is, the second entry control storage device 58 (hereinafter referred to as EROM 58), having a capacity, for example, of 256×12 bits and storing a plurality of second addresses, and to the input of an address register 60 (hereinafter referred to as RRA 60).

The output of the RRA 60 is connected to the selectors/multiplexers 54. The output of the PROM 56 is connected to a 20-bit microinstruction data register 62 (hereinafter referred to as RRD 62). The output of the EROM 58 is connected to a 12-bit second entry address register 64 (hereinafter referred to as REG 64). The outputs of the RRD 62 and REG 64 are connected to the RRD switch 55 and the REG switch 53 of the selectors/multiplexers 54, respectively. The output of the RRD 62 is also connected to a decoder (not shown).

As seen from the construction mentioned above, a major feature of the invention is that the OP code of the user instruction is used as a start address to read out a first microinstruction and the second microinstruction is read out in accordance with an address (also called a second address) from the EROM 58.

The operation of the read control system for a control storage device as mentioned above will be described.

First, a user instruction is supplied from the instruction buffer 52. The OP code of the supplied user instruction read out is supplied to the selectors/multiplexers 54. The OP code switch 51 of the selectors/multiplexers 54 is selected and the address information of the OP code is supplied to the PROM 56, the EROM 58 and the RRA 60. The memory location of the PROM 56 designated by the OP code contains a start microinstruction of a microprogram corresponding to the OP code. Accordingly, the PROM 56 is addressed by the OP code and the start microinstruction is read out. The start microinstruction read out is stored in RRD 62.

The memory location of the EROM 58 indicated buy the OP code contains an address (second address) corresponding to a memory location of the PROM 56 containing a second microinstruction to be executed following the execution of the first microinstruction read out from the PROM 56. At the same time the start microinstruction is read out into RRD 62, the second address is read out. The read out address is stored in the REG 64. This read out step occurs during the execution of the final microinstruction controlling the execution of the preceding user instruction.

The REG switch 53 of the selector(s)/multiplexer(s) 54 is selected and the second address stored in the REG 64 is supplied to the PROM 56, EROM 58 and RRA 60. The PROM 56 is therebyaddressed and the second microinstruction corresponding to the second address is read out into the RRD 62. In parallel with this read out step, the start microinstruction stored in the RRD 62 is decoded and a plurality of control signals are outputted to various sections of an information processor so as to execute the microinstruction.

When the second microinstruction corresponding to the second address stored in the REG 64 is read out from the PROM 56 to the start RRD 62, the microinstruction is executed as described above.

The address stored in the RRA 60 is incremented in parallel with the read out of the start microinstruction. The operation of the RRA 60 is disclosed in U.S. Ser. No. 085,596.

When the microinstruction read out into the RRD 62 is not a branch instruction, the RRA switch 57 is selected in the selector(s)/multiplexer(s) 54 and the address incremented in the RRA 60 is supplied to the PROM 56, EROM 58 and RRA 60. The microinstruction is read out from the PROM 56 as described above and outputted to the RRD 62. Also, the supplied address stored in the RRA 60 is incremented.

When the microinstruction read out into the RRD 62 is a branch instruction, the branch address stored in the RRD 62 is inputted to the selector(s)/multiplexer(s) 54. In the selector(s)/multiplexer(s), the RRD switch 55 is selected, the branch address is supplied to the PROM 56 and RRA 60. As a result, the microinstruction corresponding to the branch address is read out from the PROM 56 and is outputted to the RRD 62. At the same time, the address stored in the RRA 60 is incremented by one.

By the operation described above, the microinstruction(s) corresponding to the user instruction are sequentially read out from the PROM 56 to the RRD 62, the read out microinstructions are executed so that information processing with a microprogram control is performed. In the operation of the invention described above, the selectors/multiplexers 54 has the following features.

When a user instruction is executed, the OP code switch 51 is selected at a step 0, and the start microinstruction corresponding to a user instruction is read out from PROM 56. At the same time, a second address (that is, an address that specifies the location of the microinstruction to be read out next) is read out from the EROM 58. At step 1, the REG switch 53 is selected, the microinstruction corresponding to the second address is read out from the PROM 56.

When the microprogram is comprised of more than three microinstructions, after step 2, the RRA switch 57 is selected when a branch instruction is not involved. The RRD switch 55 is selected when a branch instruction is involved. In each situation a corresponding microinstruction is read out from the PROM 56. Although the EROM 58 is addressed by the address outputted from the selectors/multiplexers 54, the contents of the REG 64 are not changed after step 2 since a strobe signal is not supplied to the REG 64 unless an OP code is supplied to the EROM 58.

As described above, the read control system according to the invention supplies the OP code of the user instruction directly to the PROM 56 and reads out the start microinstruction of the microprogram corresponding to the OP code. Accordingly, the microprogram may be read out at a high speed. Moreover, since a decode ROM is not used the machine cycle is reduced by the access time for the decode ROM.

The start microinstructions of the microprograms corresponding to the user instructions are by convention stored in the addresses of the control storage device separated by 2n words (where n is a positive integer). However, the length of the microprogram corresponding to each user instruction is not necessarily 2n words. Where the length of a microprogram exceeds 2n words, for example, an additional branch instruction is needed. Conversely, where the length of a microprogram is shorter than 2n words, the memory has a useless memory area. Note here that the read control system of the present invention has the second entry control storage device. The second and the succeeding microinstructions of each microprogram may be stored in any memory area of the control storage device. Therefore, unlike a conventional read control system, an additional branch instruction is unnecessary. Further, since the control storage device has no useless memory area, the memory capacity of the control storage device is thereby effectively increased. Moreover, the read control system of the invention may read the second microinstruction from the control storage device at the same time that the start microinstruction of each microprogram is executed, as mentioned above. In this respect, it is possible to speed up theaddressing operation.

Figure 2:
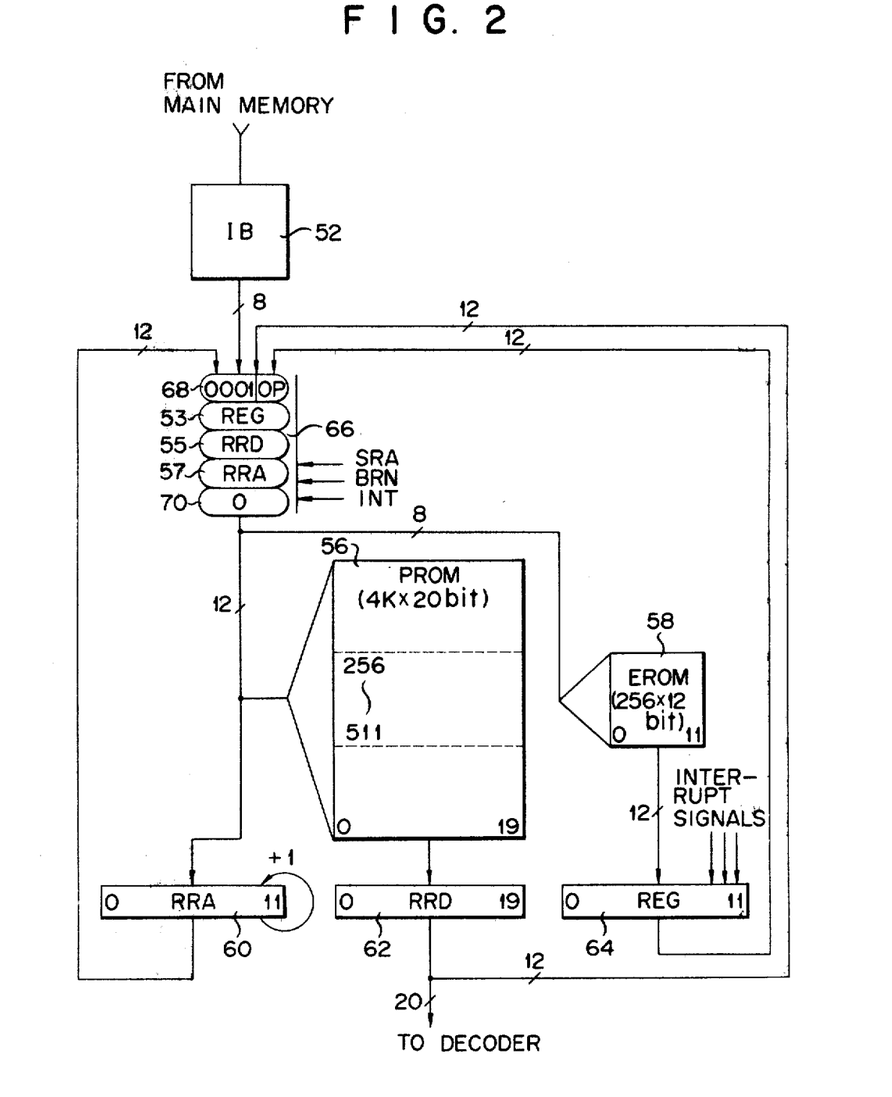
FIG. 2 shows a block diagram of a substantial part of another embodiment of the read control system according to the invention.

FIG. 2 shows a block diagram of the substantial part of yet another embodiment of the read control system of the invention. In the embodiment shown in FIG. 1, "0000" is appended to the most significant bit of the OP code. The feature of this FIG. 2 embodiment resides in the use of a binary constant of 4 bits, for example, attached to the head of the OP code. The use of the binary constant enables the memory area of the control storage device for storing the microinstructions to be adjusted. For simplicity, like symbols are used to designate like portions in FIG. 1. The FIG. 2 embodiment employs "0001" for the binary constant. Accordingly, the 12-bit start address, comprised of a 4-bit binary constant "0001" from the OP code switch 68 of the selectors/multiplexers 66 and an 8-bit OP code, is outputted. The memory locations of the addresses 256 to 511 of the PROM 56, which may be addressed by the start address store the start microinstructions of the microprograms corresponding to the OP codes of the user instructions.

The EROM 58, however, is addressed by the 8-bit OP code. Addresses of 0 through 255 are assigned. Also in this embodiment, a zero switch 70 can be included in the selectors/multiplexers 66. The zero switch 70 compensates for the fact that the selectors/multiplexers 66 has no logical "0" information as an input. Accordingly, logical "0" information is supplied to the PROM 56, the EROM 58 and the RRA 60 when the selectors/multiplexers 66 selects none of the switches 68, 53, 55 and 57.

The selectors/multiplexers 66 are explained later in conjunction with FIGS. 3 and 4. Accordingly in the FIG. 2 embodiment, a special purpose microinstruction can be stored in address 0 of the PROM 56. The special purpose microinstruction is a microinstruction to be executed first when the power is ON. When an interrupt occurs while a microinstruction is executed, the logical "0" information is outputted from the selectors/multiplexers 66.

The addressing operation of the PROM 56 is now described. A user instruction to be executed is first read out from the instruction buffer 52. An 8-bit OP code of the user instruction is supplied to the OP code switch 68 of the selectors/multiplexers 66. A 12-bit start address which is comprised of 8-bit OP code and 4-bit binary constant "0001" appended to the most significant bit of the OP code is outputted from the OP code switch 68 of the selector 66 and supplied to the PROM 56, the EROM 58 and the RRA 60.

If the start OP code is "00000001", the address is "000100000001" by which the address 257 of the PROM 56 is specified. Accordingly, the microinstruction of 20 bits stored in the address 257 of the PROM 56 is read out therefrom and is stored in the RRD 62. The microinstruction read out is the start microinstruction of a microprogram which controls the execution of the operation specified by the "00000001" as the OP code of the user instruction.

In parallel with the read out of the microinstruction, the EROM 58 is addressed by the 8-bit address (that is, the OP code "00000001"). The address of 12 bits stored in the address 1 of the EROM 58 is read out and loaded into the REG 64.

The start address is incremented by one in the RRA 60, but this incremented start address is not used. This step occurs during the execution step of the final microinstruction stored in RRD 62 and controlling the execution of the preceding user instruction.

Then, the REG switch 53 of the selectors/multiplexers 66 is selected, the address (second address) stored in the REG 64 is supplied to the PROM 56, EROM 58 and the RRA 60. Accordingly, the PROM 56 is addressed and a second microinstruction corresponding to the second address is read out into the RRD 62. At the same time, the start microinstruction stored in the RRD 62 is supplied to the decoder (not shown). At the decoder, the microinstruction is decoded and a plurality of control signals are outputted to various sections of the information processor so that the microinstruction is executed. The second microinstruction corresponding to the second address is read out into the RRD 62, and is executed during the next step (read cycle) as described above.

The second address stored in the RRA 60 is incremented by one and outputted to the selectors/multiplexers 66. When the second microinstruction read out into the RRD 62 is not a branch instruction, the RRA swtich 57 is selected at the selectors/multiplexers 66 and the incremented address is supplied to the PROM 56, the EROM 58 and the RRA 60.

In the same manner, a third microinstruction is read out from the PROM 56 and outputted to the RRD 62. The third microinstruction is also executed in parallel with the read out of the next microinstruction. The inputted address is incremented in the RRA 60 as described above.

When the second microinstruction read out into the RRD 62, is a branch instruction the branch address stored in the RRD 62 is supplied to the selectors/multiplexers 66. At this time, the RRD switch 55 is selected at the selectors/multiplexers 66 and the branch address is supplied to the PROM 56, the EROM 58 and the RRA 60. As a result, a third microinstruction corresponding to the branch address is read out from the PROM 56 and outputted to the RRD 62. The third microinstruction is also executed in parallel with the read operation of the next microinstruction. The inputted address is incremented by one in the RRA 60.

Although the EROM 58 is addressed by the address information outputted from the selectors/multiplexers 66 the contents of the REG 64 are not altered during the processing of the user instruction because the strobe signal is supplied to the REG 64 only when an address (second address) is read out from the EROM 58 by the OP code.

Although the above-mentioned embodiment employs "0001" for the binary constant added to the upper bit of the OP code, any one of those constants from "0000" to "1111" may be used for the binary constant. Further, the bit length of the binary constant is not limited to 4 bits as in the FIG. 2 embodiment but it may take any appropriate bit length in relation to the bit length of the address of the PROM 56 and the bit length of the OP code.

Figure 3:
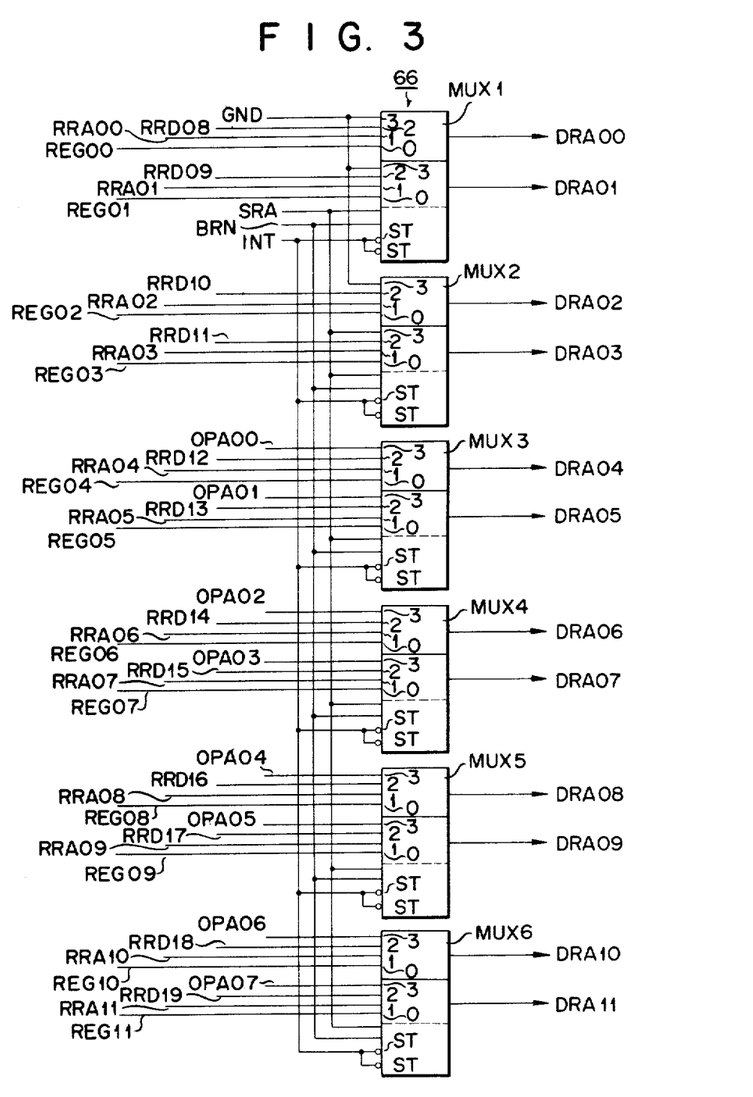
FIG. 3 shows a detailed block diagram of the selectors/multiplexers in the embodiment shown in FIG. 2.

Detailed construction of various components in the embodiment shown in FIG. 3 is now described.

FIG. 3 shows a detailed circuit block diagram of the selectors/multiplexers 66. In this embodiment, the selectors/multiplexers 66 is constructed by the six selectors/multiplexers elements MUX 1 through MUX 6. For each selectors/multiplexers element MUX 1 through MUX 6, an SN74S153 (Dual 4-line-to-1-line DATA SELECTORS/MULTIPLEXERS) by TEXAS INSTRUMENTS INCORPORATED can be used, for example. The internal construction of the selectors/multiplexers MUX 1 through MUX 6 is omitted.

To the data input terminals 0 of the selectors/multiplexers MUX 1 through MUX 6, the addresses (second addresses) REG 00 through REG 11 supplied from the REG 64 are inputted. To the data input terminals 1, the incremented addresses RRA 00 through RRA 11 supplied from the RRA 60 are inputted.

To the data input terminals 2, the branch addresses RRD 08 through RRD 19 supplied from the RRD 62 are inputted.

To the data input terminals 3, the constant "0001" and the OP code addresses OPA 00 through OPA 07 are inputted. As a way of inputting the constant, the two data input terminals 3 of the MUX 1 and the upper data input terminals 3 of the MUX 2 are grounded. To the lower of the data input terminals 3 of the MUX 2, the select signal SRA of the logical "1" which is the select condition of the OP code, is inputted so as to produce "0001".

To the selectors/multiplexers elements MUX 1 through MUX 6, an interrupt strobe signal INT, the select signal SRA of the RRA 60 and the branch select signal BRN are inputted. These signals select one address data from among the four input address data and produce address data DRA 00 through DRA 11, which are supplied to the PROM 56, the EROM 58 and the RRA 60.

The relation between the select signals of the selectors/multiplexers elements MUX 1 through MUX 6 and the outputted address data DRA 00 through DRA 11 is shown in Table 1.

TABLE 1

| Interrupt strobe signal INT | Select signal BRN | Select signal SRA | Output address information DRA 00 through DRA 11 |
| --- | --- | --- | --- |
| L | L | L | REG 00 ~ REG 11 |
| L | L | H | RRA 00 ~ RRA 11 |
| L | H | L | RRD 08 ~ RRD 19 |
| L | H | H | 0001 OPA 00 ~ OPA 07 |
| H | X | X | ALL "0" |

H = high level,
L = low level,
X = irrelevant

The use of the zero switch 70 in FIG. 2 is now described. As is clearly shown in Table 1, the address information (DRA 00~DRA 11) outputted from the MUX 1 through MUX 6 specifies address 0 when the interrupt strobe INT is at high level.

Accordingly, if the microinstruction (branch instruction) to be executed first is stored in the address 0 of the PROM 56, whn the power is ON the microinstruction (branch instruction) can be easily read out from the PROM 56 by the strobe signal INT. The read out branh microinstruction from the PROM 56 is stored in the RRD 62. At the next step, in a normal mode of operation, the REG switch 53 of the selectors/multiplexers 66 (shown in FIG. 2) is selected.

The RRD switch 55 of the selectors/multiplexers 66, however, is selected by the branch select signal BRN produced by the decoding of the branch microinstruction since the related control signals (not shown) to the EROM 58 are not in an operating state when the power is initially placed ON.

Accordingly, the branch address of the branch microinstruction stored in the RRD 62 is supplied to the PROM 56 through the RRD switch 55 and the corresponding microinstruction is read out into the RRD 62 from the PROM 56. By executing the microinstruction, a normal microprogram control is performed.

An interrupt signal strobe INT may occur during the execution of a microprogram of a user instruction. When an INT occurs, the information of address 0 is outputted from the selectors/multiplexers 66 and the branch microinstruction is read out into the RRD 62 from the PROM 56. At the same time the interrupt signal outputted in accordance with the interrupt level is inputted to the REG 64 where the fixed address is set therein. At the next step. the branch microinstruction read out into the RRD 62 is ignored and the REG switch 53 of the selectors/multiplexers is selected so that the PROM 56 is addressed by the fixed address. The microinstruction corresponding to the fixed address is read out from the PROM 56 so that the microinstruction is executed.

FIGS. 4A through 4G are timing charts of the operation of the selectors/multiplexers 66.

Figure 4A:
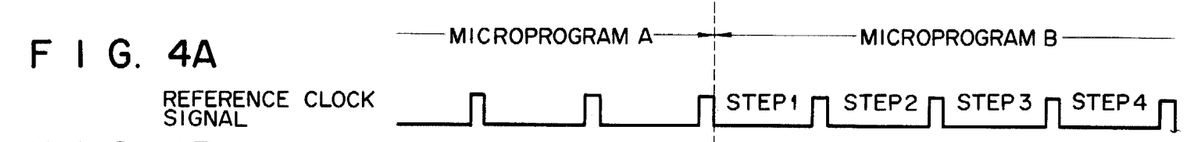
FIGS. 4A to 4G show timing charts of the selectors/multiplexers shown in FIG. 3.

FIGS. 4A shows reference clock signal of a microinstruction. Synchronized therewith, a microinstruction is executed step by step.

Figure 4B:
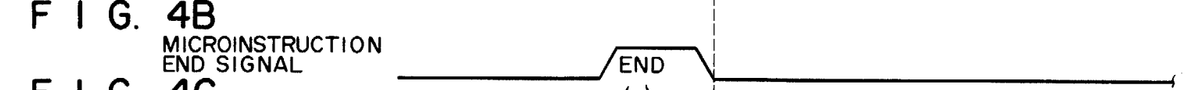

FIG. 4B shows a microinstruction END signal outputted at the step that microprogram A is terminated for example.

Figure 4C:
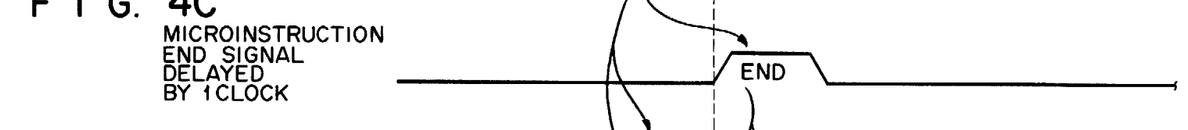
Figure 4D:
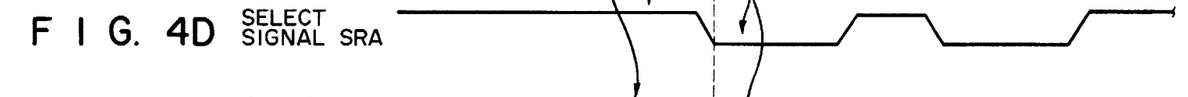
Figures 4E, 4F:
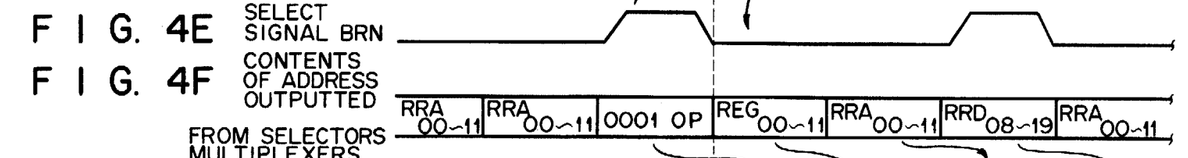

FIG. 4C shows an END signal of FIG. 4B delayed by 1 clock signal;

FIG. 4D shows the select signal SRA of FIG. 3;

FIG. 4D shows the select signal SRA of FIG. 3;

FIG. 4E shows the select signal BRN of FIG. 3;

FIG. 4F shows the contents of the address DRA outputted from the selectors/multiplexers 66 of FIG. 3 in accordance with the select signals SRA, BRN shown in FIG. 4D and FIG. 4E.

Figure 4G:
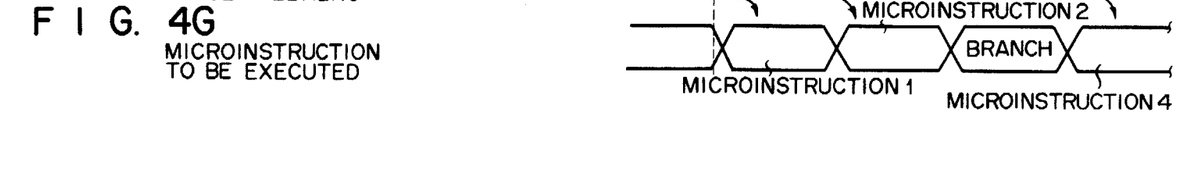

FIG. 4G shows a microinstruction to be executed. (The interrupt signal strobe INT is at low level.) The operation of the selectors/multiplexers 66 is described with reference to the timing charts in FIG.4.

As shown in FIG. 4B, a microinstruction END signal is outputted at the last of the microprogram A comprised of a plurality of microinstructions.

Also, at this step, the select signals SRA and BRN are both set at high level by the microinstruction END signal. Accordingly, as shown in Table 1, the 12-bit start address comprised of "0001 OP code" is outputted from the selectors/multiplexers 66 and is supplied to the PROM 56, the EROM 58 and the RRA 60. Also, at this step the first microinstruction 1 corresponding to the start address is read out from the PROM 56 and the address (second address) corresponding to the start address is read out into the REG 64 from the EROM 58. This step occurs during the execution step of the last microinstruction to control the execution of the preceding user instruction.

In step 1 of the microprogram B, the select signals SRA, BRN are both set to a low level by the microinstruction END signal shown in FIG. 4C. Accordingly, the second address stored in the REG 64 is outputted through the selectors/multiplexers 66 and is supplied to the PROM 56, the EROM 58 and the RRA 60 as shown in Table 1.

Also, at step 1 the microinstruction 2 is read out into the RRD 62 from the PROM 56 and the inputted address is incremented in the RRA 60. During this step the start microinstruction 1 read out from the PROM 56 at the preceding step is executed.

At step 2 the select signal SRA or BRN is set depending on whether the microinstruction read out in the RRD 62 is a branch instruction or not. If, for example, the microinstruction 2 read out into the RRD 62 from the PROM 56 is not a branch instruction, the select signal SRA is at a high level, the address data of the RRA 60 is outputted from the selectorss/multiplexers 66 to be supplied to the PROM 56, the EROM 58 and the RRA 60. Also, at step 2 the microinstruction 3 (assumed to be a branch instruction) is read out into the RRD 62 from the PROM 56, the inputted address is incremented in the RRA 60 and the microinstruction 2 read out at step 1 is executed.

At step 3, the select signal BRN is set at high level since the read out microinstruction 3 is a branch instruction. Accordingly, the branch address (RRD 08~RRD 19) of the microinstruction 3 are selectively outputted from the selectors/multiplexers 66 and are supplied to the PROM 56, the EROM 58 and the RRA 60. Also, the microinstruction 4 is read out into the RRD 62 from the PROM 56 and the supplied address is incremented in the RRA 60.

The microprogram B is executed and processed in the manner described above.

Figure 5A:
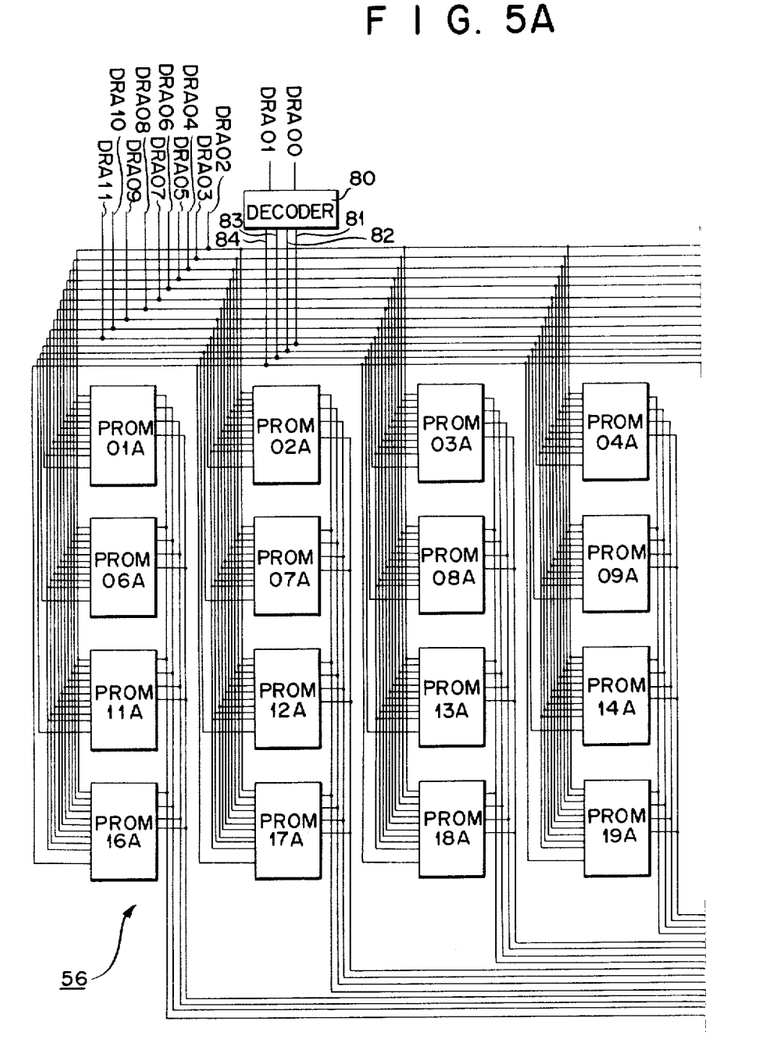
FIGS. 5A and 5B shows a detailed block diagram of the first and second control storage devices in the embodiment shown in FIG. 2.
Figure 5B:
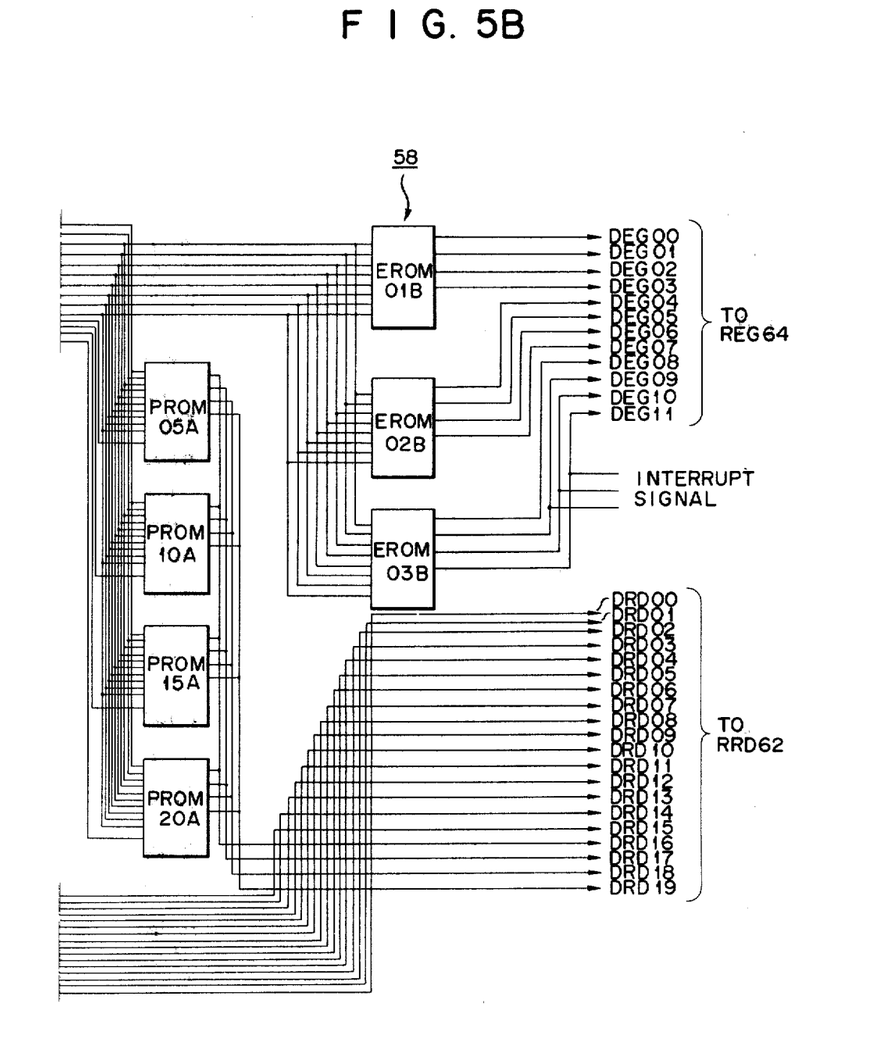

FIGS. 5A and 5B shows a block diagram of a detailed connection of the address lines and data lines of the PROM 56 and the EROM 58.

In FIG. 5A the PROM 56 of 4K words×20 bits (K=1,024) is comprised of twenty read only memory elements (01A through 20A) of 1K×4 bits. The EROM 58 of 256 words×4 bits is comprised of three read only memory elements (01B through 03B). The read only memory element, however, is not limited to the embodiment described above.

The address information DRA 00 through DRA 19 outputted from the selectors/multiplexers 66 shown in FIG. 3 is supplied to the PROM 56 and the EROM 58 through a driver circuit (not shown). The 10 bits of the address data DRA 02 through DRA 11 are connected so as to specify the memory locations of 1K words of the read only memory elements (01A through 20A) which comprise the PROM 56. The address data DRA 00 and DRA 01 are decoded so that therefore four decode singals, which are and outputted from the decoder 80, is inputted to one of four blocks (the first block 01A~05A, the second block 06A~10A, the third block 11A~15A and the fourth block 16A~20A) through the lines 81, 82, 83 and 84. Accordingly, each decode signal selects one of the memory blocks.

The select operation of the memory blocks by the decoder 80 is as shown in Table 2.

TABLE 2

| Address information | | Output line of the decode | Memory block to |
|---|---|---|---|
| DRA 00 | DRA 01 | signal | be selected |
| L | L | 81 | First memory block (01A ~ 05A) |
| L | H | 82 | Second memory block (06A ~ 10A) |
| H | L | 83 | Third memory block (11A ~ 15A) |
| H | H | 84 | Fourth memory block (16A ~ 20A) |

When the address data DRA 00 and DRA 01 are both at low level, a decode signal is outputted from the decoder 80 through the line 81 and the first memory block 01A~05A is selected. The read only memory elements 01A through 05A are addressed by the address information DRA 02 through DRA 11 and the corresponding contents of the same address are read out in 4-bit units. The total 20-bit data DRA 00~DRD 19 (that is a microinstruction) read out from the read only memory elements 01A through 05A are outputted to the RRD 62.

The read only memory elements 01B through 03B are connected so that the 8 bits of the address information DRA 04 through DRA 11 is inputted to the elements 01B through 03B. The read only memory elements 01B through 03B are addressed by the 8-bit address data DRA 04 through DRA 11 and the corresponding contents of the same address are read out in the unit of 4 bits. The total 12-bit data DEG 00 through DEG 11 (that is, the second address) read out from the read only memory elements 01B through 03B is outputted to the REG 64. The data DEG 09, 10, 11 are connected so that the interrupt signal to produce a fixed address can be inputted.

Figure 6:
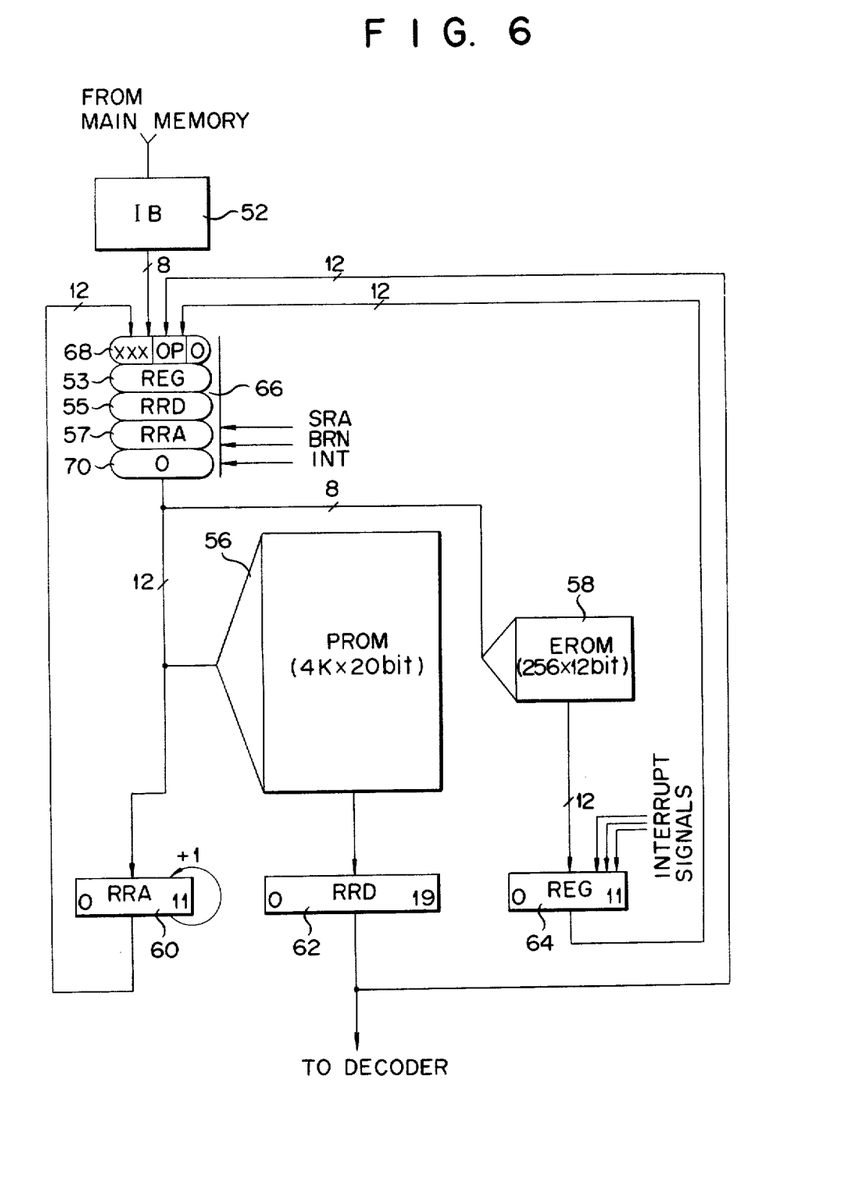
FIG. 6 shows a block diagram of a substantial part of still another embodiment of the read control system according to the invention.

FIG. 6 shows a block diagram of yet another embodiment of a read control system for a control storage device. In this embodiment, the start address selected by the OP code switch 68 of the selectors/multiplexers 66 comprises "xxxOP code 0". X can be "1" or "0".

For simplicity, like symbols are used to designate like portions in FIG. 2. In the EROM 58, the addresses (or the third addresses) specifying the location of the PROM 56 in which the third microinstructions controlling a plurality of user instruction, are stored.

In the embodiment of FIG. 2, the second addresses are stored in the EROM 58 but, in this embodiment, the third addresses are stored in the EROM 58.

If the start address selected at the OP code switch 68 is set to "001 OP code 0", for example, the address of the PROM 56 addressed by the start address are 256 even addresses (512, 514, 516, . . , 1022) ranging from address 512 to address 1024.

The start microinstructions to be executed first corresponding to the user instructions (OP codes) are stored in the 256 even addresses. The second microinstructions are stored in the 256 odd addresses (513, 515, 517, ..., 1023) ranging from address 513 to address 1023 of the PROM 56. The odd addresses of the PROM 56 are addressed by the address that is comprised of the incremented start address in the RRA 60.

The address outputted from the RRA 60 is supplied to the PROM 56 through the RRA switch 57 of the selectors/multiplexers 66.

The operation of the embodiment shown in FIG. 6 is now described. First, the OP code of the user instruction outputtted from the instruction buffer 52 at the final step of the microprogram controlling the execution of the preceding user instruction, is inputted to the selectors/multiplexers 66. At this time the select signals SRA, BRN of the selectors/multiplexers 66 are both set at high level, the start address is outputted through the OP code switch 68 to be supplied to the PROM 56, EROM 58 and the RRA 60.

Accordingly, the microinstruction to be executed first is read out into the RRD 62 from the PROM 56. The third addresses are read out into the REG 64 from the EROM 58. The start address is incremented in the RRA 60. During this step, the final microinstruction of the preceding user instruction is executed.

During the next step (or the first step of the user instruction to be executed), the first microinstruction read out into the RRD 62 is executed. In parallel with the execution of the first microinstruction, the second microinstruction is read out.

The select signal SRA of the selectors/multiplexers 66 is set at high level and the select signal BRN of the selectors/multiplexers 66 is set at low level and the incremented start address is supplied to the PROM 56, the EROM 58 and the RRA 60. Accordingly, the second microinstruction is read out into the RRD 62. The address read out from the EROM 58 is not held in the REG 64 and the contents of the REG 64 are not altered. The supplied incremented address is incremented in the RRA 60. At the next step. the second microinstruction read out in the RRD 62 is executed. If the user instruction is executed by more than three microinstructions, the read out of the third microinstruction is performed in parallel with the execution of the second microinstruction. That is, the select signals SRA and BRN of the selectors/multiplexers 66 are both set at low level, the third address outputted from the REG 60 is supplied to the PROM 56, the EROM 58 and the RRA 60 through the REG switch 53. Accordingly, the third microinstructions is read out into the RRD 62 from the PROM 56. The address read out from the EROM 58, however, is not held in the REG 64 and the contents of the REG 64 is not altered.

At the next step, the third microinstruction read out in the RRD 62 is executed. If the user instruction is executed and controlled by more than four microinstructions, the read out of the fourth microinstruction is performed in parallel with the execution of the third microinstruction. In the read out of the fourth microinstruction, the RRD switch 55 or the RRA switch 57 is selected depending on whether the third microinstruction is a branch instruction or not, the address information is supplied to the PROM 56, the EROM 58 and the RRA 60. This explanation is understood easily from the explanations of the embodiments shown in FIGS. 2 and 4, and is therefore omitted.

If a microinstruction controlling the execution of a user instruction is not presented, the OP code of the next user instruction is inputted to the selectors/multiplexers 66 and the read out of the first microinstruction controlling the execution of the next user instruction is performed in the manner described above.

Accordingly, in this embodiment, the execution of the microinstructions stored in the PROM 56 can be performed easily.

Figure 7:
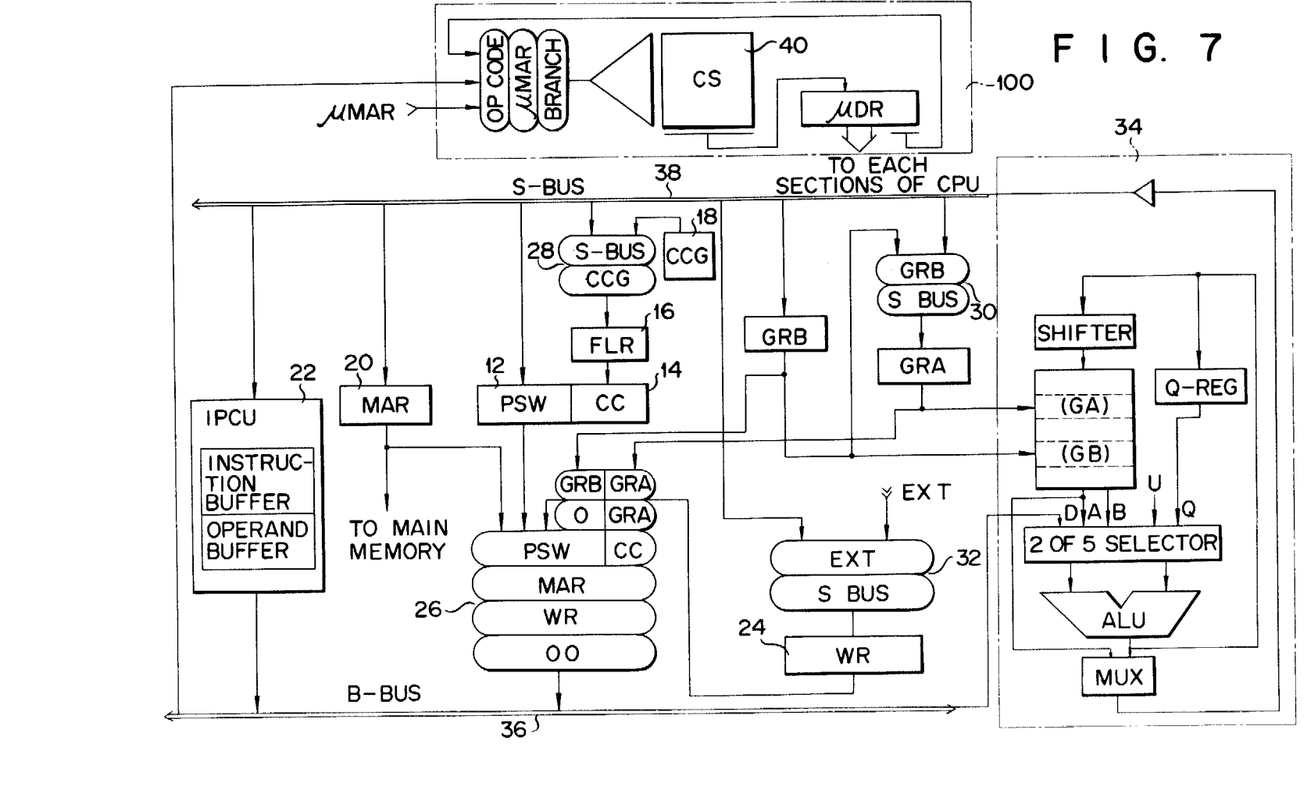
FIG. 7 shows a block diagram of an information processor to which the invention is applied.

FIG. 7 shows a block diagram of an example of an overall information processor to which an embodiment of a read control system for a control storage device according to the invention is applied.

In this figure, a program status word register PSW 12 stores an execution state of a program and includes a condition code field (CC) 14 for holding a state of the result of operation for each execution of an instruction. A value which changes in the course of operation is set in a flag register 16 and the output signal from the register 16 is inputted to the condition code field (CC) 14. A condition code generator (CCG) 18 forms the condition code. A memory address register 20 is a register for a read address or a write address of a main memory (not shown). An instruction prefetch control unit IPCU 22 has an instruction buffer and an operand buffer. The memory address register 20 prefetches an instruction from a main memory and loads it into the instruction buffer while at the same time it controls the read operation from the instruction buffer and the operand buffer. A B-bus 36 and an S-bus 38 are data buses each of 16 bits to perform data transfer among a working register 24, selectors 26, 28, 30 and 32, an arithmetic control unit 34, and various arithmetic units. The prefetch control unit (IPCU) 22 prefetches an instruction from the main memory and loads the instruction into the instruction buffer therein. At a first microstep to process the user instruction, a control storage device 40 is accessed by the OP code of the user instruction. The microinstruction corresponding to the OP code is read out from the control storage device 40 and the read out microinstruction is loaded into a microinstruction data register 42. The information processor shown in this figure is controlled by output data decoded. The construction and the operation of the information processor is discussed in detail in U.S. Ser. No. 85,596. The operation described above can be performed by constructing the microprogram control section 100 in FIG. 7 in such a manner shown in FIG. 1, FIG. 2 or FIG. 6.

What is claimed is:

1. A read control system for a control storage device, including an instruction buffer for supplying user instructions including operation codes, the system comprising:
   a first read only memory for storing at selectively addressable memory locations thereof, a plurality of microinstructions of microprograms corresponding to said user instructions;
   a second read only memory for storing a plurality of addresses for specifying memory locations in the first read only memory, said specified memory locations containing only second microinstructions of the microprograms corresponding to the user instructions;

a first register for holding a microinstruction read out from the first read only memory, said microinstruction selectively corresponding to either (1) a start microinstruction read out from said first read only memory from a memory location specified by address data comprising an operation code of a user instruction supplied by the instruction buffer, said user instruction being selectively supplied to said first read only memory concurrently with an outputting from the first register of a last microinstruction of a microprogram corresponding to a preceding user instruction, or (2) a second microinstruction read out from a memory location specified by an address derived from the second read only memory, said latter address specified by the address data comprising the operation code of the user instruction, said user instruction being selectively supplied to said second read only memory; and a second register for holding an address read out from the second read only memory, said last address being read out from said second read only memory in parallel with the reading out of the start microinstruction from the first read only memory into the first register, and for supplying said address to the first read only memory in parallel with the outputting of said start microinstruction from said first register.

2. A read control system for a control storage device according to claim 1, wherein the start microinstruction is read out from a memory location specified by address data comprising an operation code of a user instruction and a binary constant appended to the most significant bit of said operation code.

3. A read control system for a control storage device according to claim 1 or 2, wherein the second read only memory has capacity enough for storing a plurality of said addresses corresponding to all user instructions from the instruction buffer.

4. A read control system for a control storage device according to claim 1 or 2, wherein, when the microinstruction read out into the first register is a branch instruction, the next microinstruction is read out into the first register, said memory location being specified by a branch address corresponding to said branch instruction.

5. A read control system for a control storage device according to claim 1 or 2, further comprising a third register for incrementing and holding address data selectively supplied from the second register and from said first register, and for supplying said address data to the first read only memory to enable the read out of third and succeeding microinstructions of multi-instruction microprograms corresponding to the user instructions from the instruction buffer.

6. A read control system for a control storage device according to claim 5, further comprising selector means for receiving (1) address data comprising an operation code of a user instruction from the instruction buffer, (2) address data supplied from the third register, (3) an address supplied from the second register, and (4) branch address data supplied from the first register when the microinstruction read out into the first register is a branch instruction, and for selectively supplying said address data to the first read only memory, the second read only memory and the third register in accordance with a select signal supplied to said selector means; and wherein (1) the start microinstruction is read out into the first register from the first read only memory from a memory location specified by address data selectively supplied from the selector means, said latter address data comprising an operation code of a user instruction and, concurrently, said address data is supplied to the third register, said third register incrementing and holding said address data.

7. A read control system for a control storage device of claim 6, wherein a special purpose microinstruction is stored in a zero address of the first read only memory, said special purpose microinstruction being read out whenever address data for specifying said zero address is supplied from the selector means.

8. A read control system for a control storage device according to claim 7, wherein the address data for specifying the zero address is supplied from the selector means whenever an interrupt signal strobe applies an interrupt signal to the selector means.

9. A read control system for a control storage device according to claim 6, wherein the address supplied from the second register is received by and selectively supplied from the selector means concurrently with an outputting of the start microinstruction from the first register, said address specifying a memory location in the first read only memory, said memory location storing a second microinstruction of a multi-instruction microprogram corresponding to a user instruction, and said address causing said second microinstruction to be read out into said first register.

10. A read control system according to claim 6, wherein the address data supplied from the third register is selectively supplied from the selector means concurrently with the outputting of the second microinstruction from the first register when the second microinstruction is not a branch instruction, said address data specifying a memory location in the first read only memory, said memory location storing one of third and succeeding microinstructions of a multi-instruction microprogram corresponding to a user instruction, and said address data causing one of said third and succeeding microinstructions to be read out into said first register.

11. A read control system for a control storage device according to claim 6, wherein the address data supplied from the first register is selectively supplied from the selector means when the microinstruction read out into the first register is a branch instruction, said address data specifying a memory location in the first read only memory and causing a microinstruction to be ready out from said memory location into said first register.

12. A read control system for a control storage device according to claim 6, wherein (1) the start microinstruction is read out into the first register from the first read only memory from a memory location specified by address data comprising an operation code of a user instruction, a binary constant appended to the most significant bit of said operation code, and a binary constant appended to the least significant bit of said operation code, and, at the same time, said address data is supplied to the third register, said third register incrementing and holding said address data, (2) concurrently therewith, an address is read out into the second register from the second read only memory from a memory location specified by address data comprising said operation code, and (3) concurrently therewith, a last microinstruction of a microprogram corresponding to a preceeding user instruction is outputted from the first register.

13. A read control system for a control storage device according to claim 12, wherein the binary constant appended to the least significant bit of the operation code is a single-bit zero data.

14. A read control system for a control storage device according to claim 12, wherein the address data supplied from the third register is selectively supplied from the selector means concurrently with the outputting of the start microinstruction from the first register, said address data specifying a memory location in the first read only memory, said memory location storing a second microinstruction of a multi-instruction microprogram corresponding to a user instruction, and said address data causing said second microinstruction to be read into the first register.

15. A read control system for a control storage device according to claim 12, wherein the address supplied from the second register is selectively supplied from the selector means concurrently with the outputting of the second microinstruction from the first register when the second microinstruction is not a branch instruction, said address specifying a memory location in the first read only memory, said memory location storing a third microinstruction of a multi-instruction microprogram corresponding to a user instruction, and said address causing said third microinstruction to be read out into said first register.

* * * * *